(12) United States Patent
Hoshi et al.

(10) Patent No.: US 6,844,383 B2
(45) Date of Patent: Jan. 18, 2005

(54) BLOCK COPOLYMER AND COMPOSITION THEREOF

(75) Inventors: Susumu Hoshi, Yokohama (JP); Yukio Yamaura, Iwatsuki (JP); Junko Kakegawa, Kawasaki (JP); Tsutomu Sugimoto, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 87 days.

(21) Appl. No.: 10/030,911

(22) PCT Filed: May 25, 2001

(86) PCT No.: PCT/JP01/04409

§ 371 (c)(1),
(2), (4) Date: Jan. 14, 2002

(87) PCT Pub. No.: WO01/90207

PCT Pub. Date: Nov. 29, 2001

(65) Prior Publication Data

US 2003/0088004 A1 May 8, 2003

(30) Foreign Application Priority Data

May 25, 2000 (JP) ........................................ 2000-154238
Aug. 18, 2000 (JP) ........................................ 2000-248263

(51) Int. Cl.$^7$ .......................... C08F 297/04; C08K 5/09; C08K 5/10
(52) U.S. Cl. ...................... 524/291; 524/331; 524/505; 524/571; 525/98; 525/99; 525/314
(58) Field of Search ................................. 524/291, 331, 524/505, 571; 525/98, 99, 314; 526/72

(56) References Cited

U.S. PATENT DOCUMENTS

| | | | |
|---|---|---|---|
| 4,120,915 A | 10/1978 | Fodor et al. | |
| 4,167,545 A | 9/1979 | Fahrbach et al. | |
| 4,939,208 A | 7/1990 | Lanza et al. | |
| 5,096,973 A | 3/1992 | Herrmann et al. | |
| 5,210,147 A * | 5/1993 | Southwick et al. | 525/314 |
| 5,227,419 A | 7/1993 | Moczygemba et al. | |
| 6,235,847 B1 * | 5/2001 | Hoshi et al. | 525/314 |

FOREIGN PATENT DOCUMENTS

| | | |
|---|---|---|
| JP | 58-141233 A | 8/1983 |
| JP | 2-049014 A | 2/1990 |
| JP | 2-113007 A | 4/1990 |
| JP | 5-177777 A | 7/1993 |
| JP | 6-279650 A | 10/1994 |
| JP | 7-097418 A | 4/1995 |
| JP | 10-298397 A | 11/1998 |

* cited by examiner

*Primary Examiner*—Kriellion A. Sanders
(74) *Attorney, Agent, or Firm*—Birch, Stewart, Kolasch & Birch, LLP

(57) ABSTRACT

Disclosed is a block copolymer comprising at least two S polymer blocks comprising vinyl aromatic hydrocarbon monomer units, and one B polymer block or two or more B polymer blocks which contains or collectively contain isoprene monomer units and 1,3-butadiene monomer units, wherein the amount of the vinyl aromatic hydrocarbon monomer units and the total amount of the isoprene monomer units and the 1,3-butadiene monomer units are, respectively, from 60 to 95% by weight and from 40 to 5% by weight, each based on the weight of the copolymer, wherein the isoprene monomer unit/1,3-butadiene monomer unit weight ratio is from 45/55 to 97/3, and wherein the vinyl aromatic hydrocarbon monomer unit moiety of the copolymer has a short segment ratio of from 0 to 30% by weight, which is defined as the weight percentage, based on the total weight of vinyl aromatic hydrocarbon monomer units in the copolymer, of the vinyl aromatic hydrocarbon monomer units in at least one short segment consisting of 1 to 3 vinyl aromatic hydrocarbon monomer units.

9 Claims, No Drawings

BLOCK COPOLYMER AND COMPOSITION THEREOF

This application is the national phase under 35 U.S.C. § 371 of PCT International Application No. PCT/JP01/04409 which has an International filing date of May 25, 2001, which designated the United States of America.

BACKGROUND OF THE INVENTION

1. Field of the Invention

The present invention relates to a block copolymer. More particularly, the present invention is concerned with a block copolymer comprising at least two S polymer blocks, each comprising vinyl aromatic hydrocarbon monomer units, and one B polymer block or two or more B polymer blocks which contains or collectively contain isoprene monomer units and 1,3-butadiene monomer units, wherein the amount of the vinyl aromatic hydrocarbon monomer units, the total amount of the isoprene monomer units and the 1,3-butadiene monomer units, and the isoprene monomer unit/1,3-butadiene monomer unit weight ratio are within respective specific ranges, and wherein the vinyl aromatic hydrocarbon monomer unit moiety of the block copolymer has a short segment ratio within a specific range, the short segment ratio being defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units. The block copolymer of the present invention has excellent thermal stability in that, even when the blocks copolymer is heated at high temperatures, the change in the molecular weight distribution of the block copolymer due to crosslinking or breakage of polymer chains of the block copolymer can be suppressed. Therefore, even when the block copolymer is subjected to shaping at high temperatures, occurrence of gelation can be suppressed. By virtue of the above-mentioned excellent thermal stability of the block copolymer, a shaped article (such as a sheet) produced from the block copolymer is free from marked occurrence of fish eyes (hereinafter, a "fish eye" is frequently referred to simply as a "FE"). Further, the shaped article has excellent stiffness, elongation, impact resistance, transparency and heat shrinkability. Accordingly, the block copolymer of the present invention can be advantageously used for producing various shaped articles. The present invention is also concerned with a block copolymer/styrene resin composition comprising the block copolymer and a styrene resin in a specific ratio.

2. Prior Art

A block copolymer comprising vinyl aromatic hydrocarbon monomer units and conjugated diene monomer units (such as a 1,3-butadiene monomer unit) wherein the vinyl aromatic hydrocarbon monomer unit content is relatively high, has various excellent characteristics, such as transparency and impact resistance, so that the block copolymer has been used for producing injection-molded products, extrusion-molded products (such as a sheet and a film) and the like. Further, a composition comprising the block copolymer and a styrene polymer has excellent transparency and mechanical properties, so that the composition has been used for producing a sheet, a film and the like.

With respect to the block copolymer and the composition, a number of proposals have been made in patent documents. For example, in an attempt to improve the transparency and impact resistance of a block copolymer, Unexamined Japanese Patent Application Laid-Open Specification No. 52-58788 (corresponding to U.S. Pat. No. 4,167,545) discloses a branched block copolymer comprising a vinyl aromatic hydrocarbon and 1,3-butadiene, which is obtained by division-wise adding a catalyst to a block copolymerization system. Unexamined Japanese Patent Application Laid-Open Specification No. 53-8688 (corresponding to U.S. Pat. No. 4,120,915) attempts to obtain a block copolymer having an improved thermal stability by a method comprising polymerizing a vinyl aromatic hydrocarbon to obtain a vinyl aromatic hydrocarbon polymer, followed by addition of 1,3-butadiene and a small amount of isoprene to perform a coupling reaction. In an attempt to improve the impact resistance of a block copolymer, Unexamined Japanese Patent Application Laid-Open Specification No. 2-113007 discloses a block copolymer comprising a vinyl aromatic hydrocarbon polymer block and a polymer block composed mainly of isoprene, which has a specific block configuration. For the purpose of obtaining a thermoplastic polymer composition having excellent appearance (transparency, surface luster and the like) and excellent impact resistance, Unexamined Japanese Patent Application Laid-Open Specification No. 58-141233 discloses a composition comprising a vinyl aromatic hydrocarbon/1,3-butadiene block copolymer and a thermoplastic resin, wherein the block copolymer is a mixture of polymer chains which have largely different molecular weights and different compositions. For improving the environmental stress cracking resistance of a block copolymer, Unexamined Japanese Patent Application Laid-Open Specification No. 4-277509 (corresponding to U.S. Pat. No. 5,227,419 and European Patent No. 492490) discloses a method for producing a block copolymer which comprises a vinyl aromatic hydrocarbon and 1,3-butadiene and has gradually varied properties, wherein the method comprises division-wise adding a catalyst to a block copolymerization system. For obtaining a multi-layer sheet made of a thermoplastic resin (a vinyl aromatic hydrocarbon/isoprene block copolymer) which has high stiffness and is improved with respect to rapid shaping property at low temperatures and deep draw shaping property, Unexamined Japanese Patent Application Laid-Open Specification No. 5-177777 discloses a multi-layer sheet comprising a surface layer made of a first resin having a specific elastic modulus and a layer made of a second resin, in which the Vicat softening point ratio of the first resin to the second resin is within a specific range. In an attempt to obtain a block copolymer having excellent transparency and mechanical properties, Unexamined Japanese Patent Application Laid-Open Specification No. 63-145314 (corresponding to U.S. Pat. No. 4,939,208 and European Patent No. 270515) discloses a method for producing a block copolymer having an S-B-B/S-S block configuration, wherein each S independently represents a styrene polymer block, B represents a butadiene polymer block, and B/S represents a butadiene/styrene copolymer block. Further, with a view to improving the transparency and impact resistance of a block copolymer and a composition containing the block copolymer, Unexamined Japanese Patent Application Laid-Open Specification No. 7-97418 discloses a vinyl aromatic hydrocarbon/butadiene block copolymer and a composition comprising the block copolymer, in which the block copolymer has characteristic features with respect to the vinyl aromatic hydrocarbon block ratio, the arrangement of the polymer blocks, the ratio of butadiene in a segment in which a vinyl aromatic hydrocarbon and butadiene are randomly copolymerized, and the like.

However, the conventional block copolymers comprising vinyl aromatic hydrocarbon monomer units and conjugated diene monomer units disclosed in the above-mentioned patent documents have a problem in that the block copolymers have an unsatisfactory thermal stability and, hence, are susceptible to gelation during the heating thereof at high temperatures, so that shaped articles (such as a sheet) obtained from the block copolymers suffer marked occurrence of FE's which are gelled masses of a resin. The occurrence of FE's in a shaped article is disadvantageous, for example, in that, when a print is effected on the shaped article, the print inevitably becomes defective.

SUMMARY OF THE INVENTION

In this situation, the present inventors have made extensive and intensive studies with a view toward developing a block copolymer which is advantageous not only in that the block copolymer has excellent thermal stability (that is, even when the block copolymer is heated at high temperatures, the change in the molecular weight distribution of the block copolymer due to crosslinking or breakage of polymer chains of the block copolymer can be suppressed), so that occurrence of gelation of the block copolymer during the molding thereof can be suppressed, but also in that the block copolymer can be advantageously used for producing a shaped article having excellent stiffness, elongation, impact resistance, transparency and heat shrinkability. As a result, it has unexpectedly been found that a shaped article, which not only is free from marked occurrence of FE's, but also has excellent stiffness, elongation, impact resistance, transparency and heat shrinkability, can be produced by molding a block copolymer comprising at least two S polymer blocks, each comprising vinyl aromatic hydrocarbon monomer units, and one B polymer block or two or more B polymer blocks which contains or collectively contain isoprene monomer units and 1,3-butadiene monomer units, wherein the amount of the vinyl aromatic hydrocarbon monomer units, the total amount of the isoprene monomer units and the 1,3-butadiene monomer units, and the isoprene monomer unit/1,3-butadiene monomer unit weight ratio are within respective specific ranges, and wherein the vinyl aromatic hydrocarbon monomer unit moiety of the block copolymer has a short segment ratio within a specific range, the short segment ratio being defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units. Based on this finding, the present invention has been completed.

Accordingly, it is a primary object of the present invention to provide a block copolymer which can be advantageously used for producing a shaped article which not only is free from marked occurrence of FE's, but also has excellent stiffness, elongation, impact resistance, transparency and heat shrinkability.

The foregoing and other objects, features and advantages of the present invention will be apparent from the following detailed description and appended claims.

DETAILED DESCRIPTION OF THE INVENTION

According to the present invention, there is provided a block copolymer comprising:

at least two S polymer blocks, each comprising at least 70% by weight of vinyl aromatic hydrocarbon monomer units, and one or more B polymer blocks selected from the following polymer blocks (a), (b) and (c):

(a) a polymer block comprising isoprene monomer units or comprising isoprene monomer units and vinyl aromatic hydrocarbon monomer units, (b) a polymer block comprising 1,3-butadiene monomer units or comprising 1,3-butadiene monomer units and vinyl aromatic hydrocarbon monomer units, and (c) a polymer block comprising isoprene monomer units and 1,3-butadiene monomer units or comprising isoprene monomer units, 1,3-butadiene monomer units and vinyl aromatic hydrocarbon monomer units, wherein the content of the vinyl aromatic hydrocarbon monomer units in each of polymer blocks (a) to (c) is less than 70% by weight, wherein the one or more B polymer blocks are comprised of one system selected from the group consisting of (B-1) to (B-5):

(B-1) at least one polymer block (a) and at least one polymer block (b) in combination, (B-2) at least one polymer block (a) and at least one polymer block (c) in combination, (B-3) at least one polymer block (a), at least one polymer block (b) and at least one polymer block (c) in combination, (B-4) at least one polymer block (b) and at least one polymer block (c) in combination, and (B-5) at least one polymer block (c) alone, the amount of the vinyl aromatic hydrocarbon monomer units in the block copolymer and the total amount of the isoprene monomer units and the 1,3-butadiene monomer units in the block copolymer being, respectively, from 60 to 95% by weight and from 40 to 5% by weight, each based on the weight of the block copolymer, the block copolymer having an isoprene monomer unit/ 1,3-butadiene monomer unit weight ratio of from 45/55 to 97/3, and wherein the vinyl aromatic hydrocarbon monomer unit moiety of the block copolymer has a short segment ratio of from 0 to 30% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units.

For easy understanding of the present invention, the essential features and various preferred embodiments of the present invention are enumerated below.

1. A block copolymer comprising:

at least two S polymer blocks, each comprising at least 70% by weight of vinyl aromatic hydrocarbon monomer units, and one or more B polymer blocks selected from the following polymer blocks (a), (b) and (c):

(a) a polymer block comprising isoprene monomer units or comprising isoprene monomer units and vinyl aromatic hydrocarbon monomer units, (b) a polymer block comprising 1,3-butadiene monomer units or comprising 1,3-butadiene monomer units and vinyl aromatic hydrocarbon monomer units, and (c) a polymer block comprising isoprene monomer units and 1,3-butadiene monomer units or comprising isoprene monomer units, 1,3-butadiene monomer units and vinyl aromatic hydrocarbon monomer units, wherein the content of the vinyl aromatic hydrocarbon monomer units in each of polymer blocks (a) to (c) is less than 70% by weight, wherein the one or more B polymer blocks are comprised of one system selected from the group consisting of (B-1) to (B-5):

(B-1) at least one polymer block (a) and at least one polymer block (b) in combination, (B-2) at least one polymer block (a) and at least one polymer block (c) in combination, (B-3) at least one polymer block (a), at least one polymer block (b) and at least one polymer block (c) in combination, (B-4) at least one polymer block (b) and at least one polymer block (c) in combination, and (B-5) at least one polymer block (c) alone, the amount of the vinyl aromatic hydrocarbon monomer units in the block copolymer and the total amount of the isoprene monomer units and the 1,3-butadiene monomer units in the block copolymer being, respectively, from 60 to 95% by weight and from 40 to 5% by weight, each based on the weight of the block copolymer, the block copolymer having an isoprene monomer unit/1,3-butadiene monomer unit weight ratio of from 45/55 to 97/3, and wherein the vinyl aromatic hydrocarbon monomer unit moiety of the block copolymer has a short segment ratio of from 0 to 30% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units.

2. The block copolymer according to item 1 above, which comprises (B-5) at least one polymer block (c) alone as the B polymer block.

3. The block copolymer according to item 1 above, which comprises (B-1) at least one polymer block (a) and at least one polymer block (b) in combination as the B polymer block.

4. The block copolymer according to item 1 above, wherein the isoprene monomer unit/1,3-butadiene monomer unit weight ratio is in the range of from 55/45 to 95/5.

5. The block copolymer according to item 1 above, wherein the short segment ratio is in the range of from 1 to 25% by weight.

6. The block copolymer according to item 1 above, which is a linear block copolymer.

7. A block copolymer composition comprising 100 parts by weight of the block copolymer of any one of items 1 to 6 above and 0.05 to 3 parts by weight of at least one stabilizer which is selected from the group consisting of 2-(1-(2-hydroxy-3,5-di-t-pentylphenyl)-ethyl)-4,6-di-t-pentylphenyl acrylate, 2-t-butyl-6-(3-t-butyl-2-hydroxy-5-methylbenzyl)-4-methylphenyl acrylate, and 2,4-bis ((octylthio)methyl)-o-cresol.

8. A block copolymer/styrene resin composition comprising 10 to 99% by weight of the block copolymer of any one of items 1 to 6 above and 90 to 1% by weight of a styrene resin.

9. A block copolymer/styrene resin composition comprising the block copolymer composition of item 7 above and a styrene resin, wherein the weight ratio of the block copolymer present in the block copolymer composition to the styrene resin is 10/90 to 99/1.

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "1,3-butadiene monomer unit" means a monomer unit which is formed in a polymer obtained by the polymerization of the 1,3-butadiene monomer. The 1,3-butadiene monomer unit has a molecular structure wherein two carbon atoms of an olefin derived from a 1,3-butadiene monomer respectively form linkages to adjacent 1,3-butadiene monomer units.

The block copolymer of the present invention comprises: at least two S polymer blocks, each comprising at least 70% by weight of vinyl aromatic hydrocarbon monomer units, and one or more B polymer blocks selected from the following polymer blocks (a), (b) and (c): (a) a polymer block comprising isoprene monomer units or comprising isoprene monomer units and vinyl aromatic hydrocarbon monomer units, (b) a polymer block comprising 1,3-butadiene monomer units or comprising 1,3-butadiene monomer units and vinyl aromatic hydrocarbon monomer units, and (c) a polymer block comprising isoprene monomer units and 1,3-butadiene monomer units or comprising isoprene monomer units, 1,3-butadiene monomer units and vinyl aromatic hydrocarbon monomer units.

The above-mentioned one or more B polymer blocks are comprised of one system selected from the group consisting of (B-1) to (B-5): (B-1) at least one polymer block (a) and at least one polymer block (b) in combination, (B-2) at least one polymer block (a) and at least one polymer block (c) in combination, (B-3) at least one polymer block (a), at least one polymer block (b) and at least one polymer block (c) in combination, (B-4) at least one polymer block (b) and at least one polymer block (c) in combination, and (B-5) at least one polymer block (c) alone.

In the present invention, the amount of the vinyl aromatic hydrocarbon monomer units in the block copolymer is from 60 to 95% by weight, preferably from 65 to 90% by weight, more preferably from 68 to 85% by weight, based on the weight of the block copolymer.

The total amount of the isoprene monomer units and the 1,3-butadiene monomer units in the block copolymer is from 40 to 5% by weight, preferably from 35 to 10% by weight, more preferably from 32 to 15% by weight, based on the weight of the block copolymer.

When the amount of the vinyl aromatic hydrocarbon monomer units in the block copolymer is less than 60% by weight, or the total amount of the isoprene monomer units and the 1,3-butadiene monomer units in the block copolymer is more than 40% by weight, the stiffness of a shaped article obtained from the block copolymer is disadvantageously lowered. On the other hand, when the amount of the vinyl aromatic hydrocarbon monomer units in the block copolymer is more than 95% by weight, and the total amount of the isoprene monomer units and the 1,3-butadiene monomer units in the block copolymer is less than 5% by weight, the elongation and impact resistance of a shaped article obtained from the block copolymer are disadvantageously lowered.

The block copolymer of the present invention has an isoprene monomer unit/1,3-butadiene monomer unit weight ratio of from 45/55 to 97/3, preferably from 50/50 to 97/3, more preferably from 55/45 to 95/5.

When the isoprene monomer unit/1,3-butadiene monomer unit weight ratio is more than 97/3, the block copolymer has the following disadvantage. When the block copolymer is heated at high temperatures, the molecular weight distribution of the block copolymer greatly changes due to breakage of the polymer chains (this means that the amount of low molecular weight polymer chains increases). Therefore, the fluidity of the block copolymer during the molding thereof becomes dis-advantageously high. On the other hand, when the isoprene monomer unit/1,3-butadiene monomer unit weight ratio is less than 45/55, the block copolymer has the following disadvantage. When the block copolymer is heated at high temperatures, the molecular weight distribution of the block copolymer greatly changes due to the crosslinking of the polymer chains (this means that the amount of high molecular weight polymer chains increases). Therefore, gelation markedly occurs during the molding of the block copolymer.

In the block copolymer of the present invention, each S polymer block has a vinyl aromatic hydrocarbon monomer unit content of at least 70% by weight, preferably 80% by weight or more, more preferably 90% by weight or more. Each S polymer block may contain monomer units other than vinyl aromatic hydrocarbon monomer units. Examples of monomer units other than vinyl aromatic hydrocarbon monomer units include a 1,3-butadiene monomer unit and an isoprene monomer unit.

The content of the vinyl aromatic hydrocarbon monomer units in each of polymer blocks (a), (b) and (c) is less than 70% by weight, preferably 60% by weight or less, more preferably 50% by weight or less.

With respect to the amount of the isoprene monomer units in polymer block (a), there is no particular limitation as long as the block copolymer as a whole has the above-mentioned composition. However, the amount of the isoprene monomer units in polymer block (a) is preferably 30% by weight or more, more preferably 40% by weight or more, most preferably 50% by weight or more, based on the weight of polymer block (a).

With respect to the amount of the 1,3-butadiene monomer units in polymer block (b), there is no particular limitation as long as the block copolymer as a whole has the above-mentioned composition. However, the amount of the 1,3-butadiene monomer units in polymer block (b) is preferably 30% by weight or more, more preferably 40% by weight or more, most preferably 50% by weight or more, based on the weight of polymer block (b).

With respect to the total amount of the isoprene monomer units and the 1,3-butadiene monomer units in polymer block (c), there is no particular limitation as long as the block copolymer as a whole has the above-mentioned composition. However, the total amount of the isoprene monomer units and the 1,3-butadiene monomer units in polymer block (c) is preferably 30 by weight or more, more preferably 40% by weight or more, most preferably 50% by weight or more, based on the weight of polymer block (c). It is preferred that polymer block (c) is a random copolymer.

Examples of vinyl aromatic monomer units used in S polymer blocks and optionally in B polymer block include a styrene monomer unit, an o-methylstyrene monomer unit, a p-methylstyrene monomer unit, a p-tert-butylstyrene monomer unit, a 2,4-dimethylstyrene monomer unit, an α-methylstyrene monomer unit, a vinyl-naphthalene monomer unit, a vinylanthracene monomer unit, and a 1,1-diphenylethylene monomer unit. Of these, a styrene monomer unit is especially preferred. These vinyl aromatic monomer units can be used individually or in combination.

The vinyl aromatic hydrocarbon monomer unit moiety of the block copolymer of the present invention has a short segment ratio of from 0 to 30% by weight, wherein the short segment ratio is defined as the weight percentage, based on the total weight of vinyl aromatic hydrocarbon monomer units contained in the block copolymer, of the vinyl aromatic hydrocarbon monomer units contained in at least one short segment consisting of 1 to 3 vinyl aromatic hydrocarbon monomer units. The short segment ratio is preferably from 1 to 25% by weight.

When the short segment ratio is more than 30% by weight, the stiffness of the block copolymer is disadvantageously lowered.

The short segment ratio can be measured by the following method. The block copolymer is dissolved in dichloromethane. The resultant solution is subjected to oxidative degradation with ozone ($O_3$) to obtain an ozonide. The obtained ozonide is subjected to reduction in diethyl ether in the presence of lithium aluminum hydride, followed by hydrolysis with pure water. From the resultant is recovered a vinyl aromatic hydrocarbon component. The vinyl aromatic hydrocarbon component is subjected to gel permeation chromatography (GPC) to obtain a GPC chromatogram. By calculating the area ratio of the peaks in the obtained GPC chromatogram, the short segment ratio is obtained (see Takayuki Tanaka, Hisaya Sato and Yasunobu Nakafutami, "Koubunshi Gakkai Yokou-shu (Preprints of Meeting of the Society of Polymer Science)", Vol. 29, p. 2051, 1980, Japan).

The short segment ratio can be controlled by appropriately adjusting the amounts of vinyl aromatic hydrocarbon monomers, isoprene monomers and 1,3-butadiene monomers which are subjected to copolymerization, the relationship between polymerization reactivities of the monomers subjected to copolymerization and the like. Illustratively stated, the short segment ratio can be controlled by a method in which vinyl aromatic hydrocarbon monomers, isoprene monomers and 1,3-butadiene monomers are copolymerized while continuously adding a mixture thereof to the polymerization reaction system, or by a method in which vinyl aromatic hydrocarbon monomers, isoprene monomers and 1,3-butadiene monomers are subjected to copolymerization in the presence of a polar compound or a randomizing agent. These methods can be employed individually or in combination.

Examples of polar compounds and randomizing agents include ethers, such as tetrahydrofuran, diethylene glycol dimethyl ether and diethylene glycol dibutyl ether; amines, such as triethylamine and tetramethylethylenediamine; thioethers; phosphines; phosphoramides; alkylbenzenesulfonates; and potassium and sodium alkoxides.

As examples of block copolymers of the present invention, there can be mentioned linear block copolymers having block configurations represented by the following formulae (1), (2) and (3):

$$S-(B-S)_n, \qquad (1)$$

$$S-(B-S)_n-B \qquad (2)$$

and $$S-(S-B)_{n+1}. \qquad (3)$$

As further examples of block copolymers of the present invention, there can be mentioned radial block copolymers having block configurations represented by the following formulae (4), (5), (6) and (7):

$$((S-B)_k)_{m+2}-X, \quad (4)$$

$$((S-B)_k-S)_{m+2}-X, \quad (5)$$

$$((B-S)_k)_{m+2}-X \quad (6)$$

and $$((B-S)_k-B)_{m+2}-X. \quad (7)$$

In formulae (1) to (7) above, each S independently represents an S polymer block, which has a vinyl aromatic hydrocarbon monomer unit content of at least 70% by weight.

In formulae (1) to (7) above, each B independently represents a B polymer block. When the above-mentioned one or more B polymer blocks are comprised of any one of the above-mentioned systems (B-1), (B-2), (B-3) and (B-4), the block copolymer of any of formulae (1) to (7) above has two or more different B blocks. As a specific example of block copolymers of formula (1) above, there can be mentioned a block copolymer in which the above-mentioned one or more B polymer blocks are comprised of system (B-1), and n is 2, which is a block copolymer represented by the following formula:

$$S-B(a)-S-B(b)-S$$

wherein each S independently represents an S polymer block, B(a) represents the above-mentioned polymer block (a), and B(b) represents the above-mentioned polymer block (b).

In formulae (4) to (7) above, X represents a residue of a coupling reagent, such as silicon tetrachloride, tin tetrachloride, epoxidized soybean oil, tetraglycidyl-1,3-bisaminomethylcyclohexane, a hydrocarbon polyhalide, a carboxylic ester or a polyvinyl compound; or a residue of a polymerization initiator, such as a multifunctional organolithium compound.

In formulae (1) to (7) above, each of n, k and m represents a natural number. Each of n, k and m is generally from 1 to 5.

The block copolymer of the present invention can be produced by conventional methods. For example, the block copolymer can be produced by a method in which a vinyl aromatic hydrocarbon, isoprene and 1,3-butadiene are polymerized in an organic solvent in the presence of an organolithium compound as a polymerization initiator.

As an example of organic solvents used for producing the block copolymer, there can be mentioned a hydrocarbon solvent. Examples of hydrocarbon solvents include aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These hydrocarbon solvents can be used individually or in combination.

The organolithium compound, which is used as a polymerization initiator for producing the block copolymer, is an organic compound having in a molecule thereof at least one lithium atom. That is, the organolithium compound can be any of an organomonolithium compound, an organodilithium compound and an organopolylithium compound. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. These organolithium compounds can be used individually or in combination.

When the block copolymer of the present invention is produced by the above-mentioned method, the polymerization reaction conditions are as follows. The polymerization reaction temperature is generally from −10 to 150° C., preferably from 40 to 120° C. The polymerization reaction time varies depending on other reaction conditions; however, the polymerization reaction time is generally 10 hours or less, most preferably from 0.5 to 5 hours. It is preferred that the polymerization is performed in the atmosphere of an inert gas, such as nitrogen gas. With respect to the polymerization reaction pressure, there is no particular limitation as long as the pressure is sufficient to maintain the monomers and the solvent in a liquid state at a temperature within the above-mentioned polymerization reaction temperature range. Further, care must be taken so as to prevent impurities (such as water, oxygen and carbon dioxide gas), which are likely to deactivate not only the polymerization catalyst but also a living polymer being formed, from intruding into the polymerization reaction system.

From the viewpoint of the improvement in processability of the block copolymer, the melt flow rate (hereinafter, frequently referred to as "MFR") of the block copolymer is generally from 0.1 to 50 g/10 min, preferably from 1 to 20 g/10 min. In the present invention, MFR is measured in accordance with JISK-6870 under condition G (temperature: 200° C., load: 5 kg).

The block copolymer of the present invention exhibits excellent thermal stability even when heated at high temperatures. Enhancement of the thermal stability of the block copolymer can be achieved by adding thereto at least one stabilizer to thereby obtain the block copolymer composition of the present invention, wherein the stabilizer is selected from the group consisting of 2-(1-(2-hydroxy-3,5-di-t-pentylphenyl)ethyl)-4,6-di-t-pentylphenyl acrylate, 2-t-butyl-6-(3-t-butyl-2-hydroxy-5-methylbenzyl)-4-methylphenyl acrylate, and 2,4-bis((octylthio)methyl)-o-cresol. The amount of the stabilizer is from 0.05 to 3 parts by weight, preferably from 0.1 to 2 parts by weight, relative to 100 parts by weight of the block copolymer.

When the amount of the stabilizer is less than 0.05 part by weight, it becomes difficult to satisfactorily suppress the change in the molecular weight distribution of the block copolymer in the composition, which occurs due to the crosslinking or breakage of polymer chains of the block copolymer when the block copolymer composition is heated at high temperatures. On the other hand, even when the stabilizer is added to the block copolymer in an amount of more than 3 parts by weight, the effect of suppressing the change in the molecular weight distribution of the block copolymer does not increase, as compared to the case where the stabilizer is added to the block copolymer in an amount of from 0.05 to 3 parts by weight.

The block copolymer of the present invention and the block copolymer composition of the present invention can be used for producing a shaped article having excellent stiffness, elongation, impact resistance and transparency. Such an excellent effect of the block copolymer and the block copolymer composition can be enhanced by adding a styrene resin thereto to obtain a block copolymer/styrene resin composition.

The amounts of the block copolymer and the styrene resin in the block copolymer/styrene resin composition are, respectively, from 10 to 99% by weight and from 90 to 1% by weight, preferably from 10 to 90% by weight and from 90 to 10% by weight, more preferably from 15 to 85% by weight and from 85 to 15% by weight, based on the total weight of the block copolymer and the styrene resin.

When the amounts of the block copolymer and the styrene resin are, respectively, less than 10% by weight and more than 90% by weight, the impact resistance of a shaped article obtained from the block copolymer/styrene resin composition is disadvantageously lowered. On the other hand, when the amounts of the block copolymer and the styrene resin are, respectively, more than 99% by weight and less than 1% by weight, the surface properties (smoothness, blocking resistance and the like) and stiffness of a shaped article obtained from the block copolymer/styrene resin composition cannot be satisfactorily improved.

As the styrene resin, a non-rubber-modified styrene polymer can be used. A rubber-modified polystyrene can also be used as long as the block copolymer/styrene resin composition retains transparency.

Examples of non-rubber-modified styrene polymers include a polymer comprising at least one styrene type monomer selected from styrene, an α-alkyl-substituted styrene (e.g., α-methylstyrene), an alkyl substituted styrene having a structure in which an aromatic nucleus of styrene is substituted with an alkyl group, and an halogen-substituted styrene having a structure in which an aromatic nucleus of styrene is substituted with a halogen atom. Further examples of non-rubber-modified styrene polymers include a copolymer of at least one styrene type monomer selected from the above-mentioned styrene type monomers with at least one monomer which is copolymerizable with the styrene type monomer, wherein the amount of styrene type monomer is 50% by weight or more, preferably 70% by weight or more, based on the weight of the copolymer.

Examples of monomers which is copolymerizable with the styrene type monomer include acrylic acid and esters thereof, such as an alkyl acrylate wherein the alkyl group has 1 to 12 carbon atoms (e.g., methyl acrylate, ethyl acrylate, propyl acrylate and butyl acrylate); methacrylic acid and esters thereof, such as an alkyl methacrylate wherein the alkyl group has 1 to 12 carbon atoms (e.g., methyl methacrylate, ethyl methacrylate and butyl methacrylate); α,β-unsaturated dicarboxylic acids, such as fumaric acid, maleic acid and itaconic acid, and monoesters, diesters, anhydrides and imide thereof (e.g., maleic anhydride and maleimide).

Preferred examples of styrene resins include a polystyrene, a styrene/n-butyl acrylate copolymer and a styrene/methyl methacrylate copolymer. These polymers can be used individually or in combination.

The block copolymer/styrene resin composition of the present invention can be produced by any conventional method. Examples of such conventional methods include a melt-kneading method using a mixer generally used in the art, such as an open roll, an intensive mixer, an internal mixer, Ko-kneader, a continuous kneader having a twin-rotor, or an extruder, and a method in which each component is dissolved or dispersed in a solvent, followed by removal of the solvent by heating.

Each of the block copolymer, block copolymer composition and block copolymer/styrene resin composition of the present invention may further contain at least one phenolic stabilizer, such as n-octadecyl-3-(3,5-di-t-butyl-4-hydroxyphenyl)propionate, tetrakis(methylene-3-(3,5-di-t-butyl-4-hydroxyphenyl)propionate)methane, 1,3,5-trimethyl-2,4,6-tris(3,5-di-t-butyl-4-hydroxybenzyl)benzene, and 2,4-bis(n-octylthio)-6-(4-hydroxy-3,5-di-t-butylanilino)-1,3,5-triazine. The amount of the phenolic stabilizer is generally from 0.05 to 3 parts by weight, relative to 100 parts by weight of the block copolymer.

Each of the block copolymer, block copolymer composition and block copolymer/styrene resin composition of the present invention may further contain at least one organic phosphate or phosphite stabilizer, such as tris(nonylphenyl)phosphite, 2,2-methylenebis(4,6-di-t-butylphenyl)octylphosphite, 2-((2,4,8,10-tetrakis(1,1-dimethylethyl)dibenzo(d,f)(1,3,2)dioxaphosphepin-6-yl)oxy)-N,N-bis(2-((2,4,8,10-tetrakis(1,1-dimethylethyl)dibenzo(d,f)(1,3,2)dioxaphosphepin-6-yl)oxy)ethyl)ethaneamine, and tris(2,4-di-t-butylphenyl)phosphite. The amount of the organic phosphate or phosphite stabilizer is generally from 0.05 to 3 parts by weight, relative to 100 parts by weight of the block copolymer.

If desired, an additive can be added to the block copolymer, block copolymer composition and block copolymer/styrene resin composition of the present invention. Examples of additives include polymeric additives, such as a vinyl aromatic hydrocarbon/conjugated diene block copolymer elastomer in which the vinyl aromatic hydrocarbon monomer unit content is 50% by weight or less, and polyethylene terephthalate.

Further examples of additives include those which have been conventionally used as additives for plastics. Examples of such additives include inorganic reinforcing agents, such as glass fiber, glass bead, silica, calcium carbonate and talc; organic reinforcing agents, such as organic fiber, a coumarone-indene resin; crosslinking agents, such as an organic peroxide and an inorganic peroxide; pigments, such as titanium white, carbon black and iron oxide; dyes; flame retardants; antioxidants; ultraviolet light absorbers; antistatic agents; lubricants; plasticizers; fillers other than mentioned above; and mixtures thereof.

Each of the block copolymer, block copolymer composition and block copolymer/styrene resin composition of the present invention per se or a mixture thereof with a coloring agent can be molded by the same molding method as employed in the molding of an ordinary thermoplastic resin to obtain shaped articles for use in various application fields. For example, the molding can be conducted by injection molding or blow molding to obtain a container for parts of office automation apparatuses, daily commodities, food, miscellaneous goods, parts of light electric appliances and the like. Especially, each of the block copolymer, block copolymer composition and block copolymer/styrene resin composition of the present invention can be advantageously used for producing a thin film (such as a heat shrinkable film or a laminate film) and a transparent sheet (such as a blister case for food or parts of light electric appliances).

BEST MODE FOR CARRYING OUT THE INVENTION

Hereinbelow, the present invention will be described in more detail with reference to the following Examples and Comparative Examples, which should not be construed as limiting the scope of the present invention.

Various properties of block copolymers used in the following Examples and Comparative Examples were measured as follows.

(1) Melt Flow Rate (MFR)

MFR is measured in accordance with JISK-6870 under condition G prescribed therein (temperature: 200° C., load: 5 kg).

(2) Short Segment Ratio

An ozone ($O_3$)-containing oxygen gas having an ozone content of 1.5% is introduced into a solution of a block copolymer in dichloromethane at a rate of 150 ml/min to conduct an oxidative degradation of the block copolymer, thereby obtaining an ozonide. The obtained ozonide is dropwise added to a mixture of diethyl ether with lithium aluminum hydride, to thereby effect a reduction of the ozonide. Then, to, the resultant is dropwise added pure water to effect hydrolysis of the reduced product, followed by addition of potassium carbonate to salt out a vinyl aromatic hydrocarbon component. The resultant precipitated vinyl aromatic hydrocarbon component is recovered by filtration. The recovered vinyl aromatic hydrocarbon component is subjected to gel permeation chromatography (GPC) to obtain a GPC chromatogram. By calculating the area ratio of the peaks in the obtained GPC chromatogram, the short segment ratio is obtained (see Takayuki Tanaka, Hisaya Sato and Yasunobu Nakafutami, "Koubunshi Gakkai Yokoushu (Preprints of Meeting of the Society of Polymer Science)", Vol. 29, p. 2051, 1980, Japan). In the above-mentioned oxidative degradation, as an apparatus for generating ozone, an ozone generating machine (OT-31R-2, manufactured and sold by Nippon Ozone Co., Ltd., Japan) is used. In the GPC, chloroform is used as a solvent. The GPC is conducted using shimpack HSG-40H, shimpack GPC-802 and shimpack GPC-801 (each of which is manufactured and sold by Shimadzu Corporation, Japan) which are connected in series in this order as viewed in the direction of flow of the solvent.

Further, in the following Examples and Comparative Examples, the following evaluations were made.

(1) Thermal Stability:

With respect to each of stabilizer-containing block copolymer compositions which have the compositions shown in Table 3 or 4 except that styrene resins shown in Table 3 or 4 are not used, the thermal stability is evaluated as follows. The block copolymer composition is heated to 230° C. in a nitrogen gas atmosphere and, then, allowed to stand still for 60 minutes. Before the heating and after 60 minutes of the standing, the block copolymer is subjected to GPC, thereby obtaining two GPC charts (hereinafter, the GPC charts obtained with respect to the block copolymer before the heating and after 60 minutes of the standing are referred to as "first GPC chart" and "second GPC chart", respectively). The first and second GPC charts, which have the same size and the same peak area, are superimposed. Since the molecular weight distribution of the block copolymer is broadened by the heating thereof, the peak in the second GPC chart is broader than that in the first GPC chart. Therefore, the superimposed GPC charts contains non-overlapping peak portions which are positioned at both sides (i.e., a high molecular weight side and a low molecular weight side) of the peak of the first GPC chart.

The ratio of the area of the non-overlapping portion of the peak on the low molecular weight side to the area of the whole peak is defined as the low molecular weight component ratio (% by weight), whereas the ratio of the area of the non-overlapping portion of the peak on the high molecular weight side to the area of the whole peak is defined as the high molecular weight component ratio (% by weight).

The increase in the low molecular weight component ratio means the increase in the occurrence of the breakage of polymer chains of the block copolymer. The increase in the high molecular weight component ratio means the increase in the occurrence of the crosslinking of polymer chains of the block copolymer.

(2) Surface Impact Strength (Index for Impact Resistance)

The measurement is conducted at 23° C. in accordance with ASTMD-1709, except that the diameter of the weight is ½ inch, to obtain a 50% breakage value.

(3) Modulus in Tension (Index for Stiffness) and Elongation at Break:

With respect to a test sample in the form of a sheet having a width of 12.7 mm, the measurement is conducted at a pulling rate of 5 mm/min with respect to each of an extrusion direction of the sample and a direction perpendicular to the extrusion direction, wherein the distance between the gage marks is 50 mm.

(4) Haze

The surface of a sheet is coated with liquid paraffin and, then, the haze of the sheet is measured in accordance with ASTM D1003.

(5) Fish Eye (FE)

Sheets having a thickness of 0.3 mm are continuously produced for 6 hours by continuously molding a block copolymer composition or a block copolymer/styrene resin composition at an extrusion temperature of 235° C. using a 40 mm sheet extruder (i.e., an extruder for producing sheets, which has a screw having a diameter of 40 mm). With respect to each of the sheets produced at the points in time of 5 minutes and 6 hours after the start of the continuous molding, the number of FE's having a size of 0.5 mm or more observed per 300 cm$^2$ of the sheet is counted. Based on the difference in the number of FE's between the two sheets, the occurrence of FE's is evaluated as follows:

○: The difference is less than 50.

Δ: The difference is from 50 to 100.

×: The difference is more than 100.

(6) 80° C. Shrinkage Factor (Index for Shrinkability at Low Temperatures)

A heat shrinkable film having a thickness of about 60 μm is immersed in hot water having a temperature of 80° C. for 5 minutes, wherein, as described below in Examples 16 and 17, the heat shrinkable film is obtained by uniaxially stretching a 0.25 mm-thick sheet made of a block copolymer/styrene resin composition 5-fold at 104° C. in a direction perpendicular to an extrusion direction of the sheet by the use of a tenter. The 80° C. shrinkage factor of the heat shrinkable film is calculated by the following formula:

$$80° C. \text{ shrinkage factor } (\%) = \{(L-L_1)/L\} \times 100$$

wherein L represents the length of the heat shrinkable film before the immersion thereof in the hot water having a temperature of 80° C., and $L_1$ represents the length of the heat shrinkable film after 5 minutes of the immersion thereof in the hot water.

(7) Natural Shrinkage Factor

With respect to each of three heat shrinkable films having a thickness of about 60 μm, the 80° C. shrinkage factor thereof is measured in accordance with the above-mentioned method, wherein, as described below in Examples 16 and 17, these three heat shrinkable films are, respectively, obtained by uniaxially stretching 0.25 mm-thick sheets made of a block copolymer/styrene resin composition 5-fold at 104° C., 108° C. and 112° C. in a direction perpendicular to an extrusion direction of the sheet by the use of a tenter. Each of the three heat shrinkable films is allowed to stand still at 35° C. for 5 days and, then, the "NS value" which is defined by the following formula is obtained:

$$NS \text{ value } (\%) = \{(L_2-L_3)/L_2\} \times 100$$

wherein $L_2$ and $L_3$ represent the lengths of the sheet before and after 5 days of the standing at 35° C., respectively.

The obtained three NS values (ordinate) are plotted against the 80° C. shrinkage factor values (abscissa) to obtain a graph showing a relationship between the 80° C.

shrinkage factor and the NS value. From the obtained graph, the NS value at a 80° C. shrinkage factor of 40% is obtained. The thus obtained NS value (at a 80° C. shrinkage factor of 40%) is defined as the natural shrinkage factor.

(8) Resistance to Fusion Bonding in Hot Water

Each of three heat shrinkable films (which are the same as used in item (6) above) is twined around a glass bottle having a diameter of about 8 cm. Then, the three glass bottles are immersed in hot water having a temperature 70° C. and allowed to stand still in the hot water for 5 minutes, wherein the three glass bottles are placed in the hot water so that the three glass bottles are in contact with each other through the heat shrinkable films. Then, the conditions of the films twined round the glass bottles are visually observed, and the resistance to fusion bonding in hot water is evaluated in accordance with the following criteria:

⊚: The films are not fusion bonded to each other at all.

○: The films are fusion bonded to each other so weakly that the films are easily separated from each other.

×: The films are fusion bonded to each other so strongly that films are not easily separated from each other.

Styrene resins A-1 to A-3, which were used in the following Examples and Comparative Examples, are shown in Table 1 below.

Styrene resin A-1 is a general-purpose polystyrene (manufactured and sold by A & M Styrene Co., Ltd., Japan). The MFR of styrene resin A-1 was measured and found to be 2.8.

Styrene resin A-2 (styrene/n-butyl acrylate copolymer) was produced as follows.

To a 10-liter autoclave equipped with a stirrer were added 4.2 kg of styrene and 0.8 kg of n-butyl acrylate simultaneously with 0.3 kg of ethylbenzene and 1 g of 1,1-bis(t-butylperoxy)cyclohexane (which was used for adjusting the MFR of styrene resin A-2 to be produced). Then, polymerization reaction was performed, while changing the reaction temperature as follows: at 110° C. for 3 hours, at 130° C. for 3 hours, and at 150° C. for 2 hours. The polymerization pressure was 1.5 kg/cm$^2$G. From the resultant polymer were removed unreacted monomers (i.e., styrene, n-butyl acrylate, and ethylbenzene) using a vented extruder to thereby obtain styrene resin A-2. The MFR of styrene resin A-2 was measured and found to be 3.0.

Styrene resin A-3 (styrene/n-butyl acrylate copolymer) was produced in substantially the same manner as in the production of styrene resin A-2, except that the composition of the copolymer was changed as shown in Table 1. The MFR of styrene resin A-3 was measured and found to be 3.0.

Each of Block copolymers B-1 to B-17 used in the following Examples and Comparative Examples was produced as follows. Polymerization was performed in a cyclohexane solvent in the presence of n-butyllithium as a polymerization initiator, wherein monomers are added to a polymerization reaction system in amounts wherein the composition described in the item "block configuration" of Table 2 is achieved and in an order wherein a block copolymer having a block configuration described in Table 2 is formed from the left end to the right end of the block configuration, to thereby obtain a block copolymer. To the obtained block copolymer were added stabilizers to obtain a block copolymer in the form of a composition thereof with stabilizers.

The types and amounts of stabilizers added to block copolymers B-1 to B-16 are described in Tables 3 and 4. The types and amounts of stabilizers added to block copolymer B-17 are described in Table 5.

With respect to the method for producing block copolymer B-1, a more detailed explanation is made below. Into a 30-liter sealed reactor having a jacket were charged a 20% by weight cyclohexane solution of a mixture of isoprene and 1,3-butadiene, which contains 6 parts by weight of isoprene and 2 parts by weight of 1,3-butadiene. Into the reactor were charged 0.085 part by weight of n-butyllithium. The reactor was purged with nitrogen gas. A first polymerization reaction was performed at 80° C. for 20 minutes while maintaining the pressure in the reactor within the range of from 3 to 5 kg/cm$^2$G. Then, a 20% by weight solution of styrene in cyclohexane, which contains 21 parts by weight of styrene, was charged at one time into the reactor to perform a second polymerization reaction at 80° C. for 20 minutes. Then, a 20% by weight cyclohexane solution of a mixture of isoprene and 1,3-butadiene, which contains 3 parts by weight of isoprene and 1 part by weight of 1,3-butadiene, was charged at one time into the reactor to perform a third polymerization reaction at 80° C. for 10 minutes. Then, a fourth polymerization reaction was performed at 80° C. while continuously charging over 30 minutes into the reactor a 20% by weight cyclohexane solution of a mixture of isoprene, 1,3-butadiene and styrene, which contains 11 parts by weight of isoprene, 7 parts by weight of 1,3-butadiene and 5 parts by weight of styrene. Then, a 20% by weight solution of styrene in cyclohexane, which contains 44 parts by weight of styrene, was charged at one time into the reactor to perform a fifth polymerization reaction at 80° C. for 35 minutes. Thereafter, methanol was fed to the reactor in a molar amount 0.9 time the molar amount of the n-butyllithium used, and the contents of the reactor were stirred for 5 minutes, followed by addition of stabilizers. Then, the cyclohexane solvent was removed from the reactor. Thus, block copolymer B-1 was obtained in the form of a composition thereof with stabilizers.

With respect to block copolymers B-2 to B-4, B-6 to B-10 and B-12 to B-17, the production thereof were performed in substantially the same manner as in the production of block copolymer B-1, except that the types and amounts of components used were changed as described in Tables 2 to 5. With respect to block copolymers B-5 and B-11, the production thereof were performed in substantially the same manner as in the production of block copolymer B-1, except that types and amounts of components used were changed as described in Tables 2 to 4, and that, before the charging of methanol into the reactor, silicon tetrachloride was charged into the reactor in a molar amount 0.25 time the molar amount of the n-butyllithium used.

All of the MFR's of block copolymers B-1 to B-17 were measured and found to be in the range of from 5 to 10, wherein the measurement of the MFR of each of block copolymers B-1 to B-17 was conducted with respect to the composition thereof with stabilizers.

The styrene content (% by weight), short segment ratio (% by weight) and block configuration of each of block copolymers B-1 to B-17 are shown in Table 2.

The measurement of the short segment ratio of each of block copolymers B-1 to B-17 was conducted with respect to a sample of the block copolymer, which was taken before the addition of the stabilizers.

Examples 1 to 15 and
Comparative Examples 1 to 4

In each of Examples 1 to 15 and Comparative Examples 1 to 4, a block copolymer composition or block copolymer/styrene resin composition having a composition shown in Table 3 or 4 was subjected to extrusion molding at an extrusion temperature of 200° C. using a 40 mm sheet extruder, thereby obtaining a sheet having a thickness of 0.25 mm. The modulus in tension, elongation at break and haze of the sheet were measured in accordance with the above-mentioned methods. Further, a sheet having a thickness of 0.6 mm was produced by substantially the same method as described above, and the surface impact strength of the sheet was measured in accordance with the above-mentioned method. Also, FE was evaluated in accordance with the above-mentioned method.

The results are shown in Tables 3 and 4.

Examples 16 and 17

In each of Examples 16 and 17, a block copolymer/styrene resin composition having a composition shown in Table 5 was subjected to extrusion molding at an extrusion temperature of 200° C. using a 40 mm sheet extruder, thereby obtaining a sheet having a thickness of 0.25 mm.

Using a tenter, a sample of the obtained sheet was uniaxially stretched 5-fold at 104° C. in a direction perpendicular to an extrusion direction of the sheet to obtain a stretched film (a heat shrinkable film) having a thickness of about 60 μm. With respect to the obtained stretched film, the 80° C. shrinkage factor and the resistance to fusion bonding in hot water were measured in accordance with the above-mentioned methods.

In addition, using the tenter, further samples of the sheet having a thickness of 0.25 mm were stretched 5-fold at 108° C. and at 112° C., respectively, in a direction perpendicular to an extrusion direction of the sheet to obtain two stretched films (heat shrinkable films), each having a thickness of about 60 μm.

With respect to the thus obtained three stretched films, each having a thickness of about 60 μm, the natural shrinkage factor thereof was measured in accordance with the above-mentioned method.

The results are shown in Table 5.

TABLE 1

| | |
|---|---|
| A-1 | A & M polystyrene 685 |
| A-2 | Styrene/n-butyl acrylate copolymer (styrene content: 84% by weight) |
| A-3 | Styrene/n-butyl acrylate copolymer (styrene content: 78% by weight) |

TABLE 2

| | Styrene content (% by weight) | Isoprene/1,3-butadiene weight ratio | Short segment ratio (% by weight) | Block configuration *1 |
|---|---|---|---|---|
| B-1 | 70 | 67/33 | 3.8 | I/B(6/2)-$S_1$(21)-I/B(3/1)-I/B/S(11/7/5)-$S_2$(44) |
| B-2 | 82 | 56/44 | 9.5 | $S_1$(38)-I/B/S(10/8/13)-$S_2$(31) |
| B-3 | 76 | 71/29 | 17.6 | $S_1$(32)-I/B(9/1)-I/B/S(8/6/18)-$S_2$(26) |
| B-4 | 68 | 81/19 | 9.1 | $S_1$(15)-I/B(11/1)-I/B/S(15/5/9)-$S_2$(44) |
| B-5 | 73 | 63/37 | 10.8 | [$S_1$(45)-I/B/S(15/9/13)-$S_2$(15)-I/B(2/1)]$_4$X |
| B-6 | 77 | 48/52 | 7.8 | $S_1$(33)-I/B/S(11/12/9)-$S_2$(35) |
| B-7 | 72 | 86/14 | 4.2 | I(6)-$S_1$(23)-B(4)-I/S(18/5)-$S_2$(44) |
| B-8 | 80 | 60/40 | 8.9 | $S_1$(34)-I/S(12/8)-B/S(8/5)-$S_2$(33) |
| B-9 | 77 | 61/39 | 10.1 | $S_1$(30)-I(5)-B(5)-B/S(4/8)-I/S(9/10)-$S_2$(29) |
| B-10 | 70 | 80/20 | 7.1 | $S_1$(16)-I(9)-B(2)-I/S(15/7)-B/S(4/2)-$S_2$(45) |
| B-11 | 72 | 71/29 | 8.3 | [$S_1$(46)-I/S(15/8)-B/S(8/4)-$S_2$(14)-I(5)]$_4$X |
| B-12 | 75 | 56/44 | 13.1 | $S_1$(24)-I/S(14/10)-B/S(11/8)-$S_2$(33) |
| B-13 | 57 | 23/77 | 0.9 | I/B(5/15)-$S_1$(10)-I/B/S(5/18/2)-$S_2$(45) |
| B-14 | 96 | 75/25 | 4.2 | $S_1$(43)-I/B/S(3/1/6)-$S_2$(47) |
| B-15 | 70 | 17/83 | 31.2 | $S_1$(15)-I(5)-B/S(25/37)-$S_2$(18) |
| B-16 | 75 | 28/72 | 10.6 | $S_1$(20)-I/B(3.5/5.5)-I/B/S(3.5/5.5/15)-B(7)-$S_2$(40) |
| B-17 | 73 | 78/22 | 28.9 | I/B/S(3/1/32)-I/B/S(15/4/22)-I/B/S(3/1/19) |

*1: Each "I" independently represents an isoprene polymer block, each "I/S" independently represents an isoprene/styrene copolymer block, each "B" independently represents a 1,3-butadiene polymer block, each "B/S" independently represents a 1,3-butadiene/styrene copolymer block, each "I/B" independently represents an isoprene/1,3-butadiene copolymer block, each "I/B/S" independently represents an isoprene/1,3-butadiene/styrene copolymer block, each of "S", "$S_1$" and "$S_2$" independently represents a styrene polymer block, and "X" represents a silicon tetrachloride residue. Numbers shown in parentheses indicate the amounts of components (% by weight).

TABLE 3

| | Example 1 | Example 2 | Example 3 | Example 4 | Example 5 | Example 6 | Example 7 | Example 8 |
|---|---|---|---|---|---|---|---|---|
| Composition | | | | | | | | |
| Type and amount of the styrene resin | A-2 | A-1 | A-2 | A-2 | A-2 | A-1 | A-1/A-2 | — |
| (% by weight) *1 | 45 | 25 | 50 | 10/50 | 50 | 20 | 5/45 | |
| Type and amount of the block copolymer | B-1 | B-2 | B-3 | B-4 | B-5 | B-6 | B-1 | B-2 |
| (% by weight) *1 | 55 | 75 | 50 | 40 | 50 | 80 | 50 | 100 |
| Stabilizer | | | | | | | | |
| Type of the stabilizer *2 | A/D | A/B/C | A/C/F | A/D/E | A/B/F | D/F | A/D | A/B/C |
| Amount of the stabilizer *3 (part by weight) | A: 0.3 D: 0.1 | A: 0.1 B: 0.2 C: 0.1 | A: 0.1 C: 0.1 F: 0.3 | A: 1.2 D: 0.5 E: 0.1 | A: 0.5 B: 0.2 F: 0.3 | D: 0.2 F: 0.4 | A: 0.2 D: 0.1 | A: 0.1 B: 0.2 C: 0.1 |

TABLE 3-continued

|  |  | Example 1 | Example 2 | Example 3 | Example 4 | Example 5 | Example 6 | Example 7 | Example 8 |
|---|---|---|---|---|---|---|---|---|---|
| Thermal stability |  |  |  |  |  |  |  |  |  |
| High molecular weight component ratio (% by weight) |  | 0.6 | 1.0 | 0.6 | 0.5 | 0.6 | 1.8 | 0.6 | 1.0 |
| Low molecular weight component ratio (% by weight) |  | 0.7 | 0.5 | 0.9 | 0.3 | 0.5 | 1.0 | 0.7 | 0.5 |
| Properties of the sheet |  |  |  |  |  |  |  |  |  |
| Modulus in tension (kgf/cm$^2$) | extrusion direction | 12500 | 14600 | 13400 | 13200 | 13800 | 13700 | 13100 | 13600 |
|  | direction perpendicular to the extrusion direction | 11000 | 13300 | 11600 | 12400 | 12900 | 13400 | 11300 | 12700 |
| Elongation at break (%) | extrusion direction | 90 | 35 | 70 | 75 | 50 | 60 | 70 | 85 |
|  | direction perpendicular to the extrusion direction | 135 | 55 | 100 | 85 | 95 | 70 | 125 | 105 |
| Surface impact strength (kg · cm) |  | 100 | 70 | 80 | 80 | 60 | 65 | 85 | 90 |
| Haze (%) |  | 0.7 | 1.3 | 0.7 | 0.8 | 0.7 | 1.4 | 1.0 | 0.5 |
| FE |  | ○ | ○ | ○ | ○ | ○ | Δ | ○ | 603 |

*1: The amounts of the styrene resin and the block copolymer are indicated in terms of % by weight, based on the total weight of the styrene resin and the block copolymer.
*2: Stabilizer A: 2-(1-(2-hydroxy-3,5-di-t-pentylphenyl)ethyl)-4,6-di-t-pentylphenyl acrylate
Stabilizer B: 2-t-butyl-6-(3-t-butyl-2-hydroxy-5-methylbenzyl)-4-methylphenyl acrylate
Stabilizer C: 2,4-bis((octylthio)methyl)-o-cresol
Stabilizer D: n-octadecyl-3-(3,5-di-t-butyl-4-hydroxyphenyl)propionate
Stabilizer E: tetrakis(methylene-3-(3,5-di-t-butyl-4-hydroxyphenyl)propionate)methane
Stabilizer F: tris(nonylphenyl)phosphite
*3: The amounts of the stabilizers are indicated in terms of parts by weight, relative to 100 parts by weight of the block copolymer.

TABLE 4

|  |  | Example 9 | Example 10 | Example 11 | Example 12 | Example 13 | Example 14 |
|---|---|---|---|---|---|---|---|
| Composition |  |  |  |  |  |  |  |
| Type and amount of the styrene resin (% by weight) *1 |  | A-2<br>45 | A-1<br>20 | A-2<br>55 | A-2<br>60 | A-2<br>55 | A-1/A-2<br>10/10 |
| Type and amount of the block copolymer (% by weight) *1 |  | B-7<br>55 | B-8<br>80 | B-9<br>45 | B-10<br>40 | B-11<br>45 | B-12<br>80 |
| Stabilizer |  |  |  |  |  |  |  |
| Type of the stabilizer *2 |  | A/D/E | A/B/F | A/D | A/D/F | A/B/C | A/D/F |
| Amount of the stabilizer *3 (part by weight) |  | A: 0.2<br>D: 0.1<br>E: 0.1 | A: 0.5<br>B: 0.2<br>F: 0.3 | A: 0.3<br>D: 0.1 | A: 1.2<br>D: 0.3<br>F: 0.5 | A: 0.2<br>B: 0.2<br>C: 0.1 | A: 0.5<br>D: 0.2<br>F: 0.4 |
| Thermal stability |  |  |  |  |  |  |  |
| High molecular weight component ratio (% by weight) |  | 0.6 | 0.8 | 0.7 | 0.5 | 0.7 | 0.9 |
| Low molecular weight component ratio (% by weight) |  | 0.9 | 0.3 | 0.9 | 0.4 | 0.6 | 0.9 |
| Properties of the sheet |  |  |  |  |  |  |  |
| Modulus in tension (kgf/cm$^2$) | extrusion direction | 12800 | 14200 | 13900 | 13500 | 14100 | 13400 |
|  | direction perpendicular to the extrusion direction | 11100 | 12900 | 12000 | 12400 | 13300 | 13100 |
| Elongation at break (%) | extrusion direction | 80 | 40 | 60 | 70 | 45 | 65 |
|  | direction perpendicular to the extrusion direction | 135 | 60 | 85 | 80 | 80 | 75 |
| Surface impact strength (kg · cm) |  | 95 | 75 | 70 | 80 | 55 | 70 |
| Haze (%) |  | 0.7 | 1.2 | 0.6 | 0.8 | 0.7 | 1.0 |
| FE |  | ○ | ○ | ○ | ○ | ○ | 603 |

|  | Example 15 | Comparative Example 1 | Comparative Example 2 | Comparative Example 3 | Comparative Example 4 |
|---|---|---|---|---|---|
| Composition |  |  |  |  |  |
| Type and amount of the styrene resin (% by weight) *1 | — | A-1/A-2<br>10/40 | A-1<br>95 | A-2<br>45 | A-1/A-2<br>30/30 |
| Type and amount of the block copolymer (% by weight) *1 | B-12<br>100 | B-15<br>50 | B-14<br>5 | B-13<br>55 | B-16<br>40 |

TABLE 4-continued

| Stabilizer | | | | | | |
|---|---|---|---|---|---|---|
| Type of the stabilizer *2 | | A/D/F | E/F | E/D | A/F | F |
| Amount of the stabilizer *3 | | A: 0.5 | E: 0.1 | E: 0.3 | A: 0.2 | F: 0.5 |
| (part by weight) | | D: 0.2 | F: 0.2 | D: 0.1 | F: 0.1 | |
| | | F: 0.4 | | | | |
| Thermal stability | | | | | | |
| High molecular weight component ratio (% by weight) | | 0.9 | 6.8 | 0.8 | 4.8 | 3.2 |
| Low molecular weight component ratio (% by weight) | | 0.9 | 1.3 | 3.2 | 1.0 | 2.9 |
| Properties of the sheet | | | | | | |
| Modulus in tension (kgf/cm$^2$) | extrusion direction | 12000 | 8400 | 27000 | 10500 | 15500 |
| | direction perpendicular to the extrusion direction | 10500 | 5000 | 26000 | 7400 | 13400 |
| Elongation at break (%) | extrusion direction | 110 | 150 or more | 3 or less | 150 or more | 45 |
| | direction perpendicular to the extrusion direction | 155 | 150 or more | 3 or less | 150 or more | 60 |
| Surface impact strength (kg · cm) | | 140 | 200 or more | 3 or less | 200 or more | 45 |
| Haze (%) | | 0.5 | 1.6 | 0.5 | 3.9 | 1.8 |
| FE | | ○ | X | ○ | X | Δ |

*1: The amounts of the styrene resin and the block copolymer are indicated in terms of % by weight, based on the total weight of the styrene resin and the block copolymer.
*2: Stabilizer A: 2-(1-(2-hydroxy-3,5-di-t-pentylphenyl)ethyl)-4,6-di-t-pentylphenyl acrylate
Stabilizer B: 2-t-butyl-6-(3-t-butyl-2-hydroxy-5-methylbenzyl)-4-methylphenyl acrylate
Stabilizer C: 2,4-bis((octylthio)methyl)-o-cresol
Stabilizer D: n-octadecyl-3-(3,5-di-t-butyl-4-hydroxyphenyl)propionate
Stabilizer E: tetrakis(methylene-3-(3,5-di-t-butyl-4-hydroxyphenyl)propionate)methane
Stabilizer F: tris(nonylphenyl)phosphite
*3: The amounts of the stabilizers are indicated in terms of parts by weight, relative to 100 parts by weight of the block copolymer.

TABLE 5

| | Example 16 | Example 17 |
|---|---|---|
| Composition | | |
| Type and amount of the styrene resin (% by weight) *1 | A-2 50 | A-3 60 |
| Type and amount of the block copolymer (% by weight) *1 | B-17 50 | B-3 40 |
| Stabilizer | | |
| Type of the stabilizer *2 | A/D | A/C/F |
| Amount of the stabilizer (part by weight) *3 | A: 0.3 D: 0.1 | A: 0.1 C: 0.1 F: 0.3 |
| Heat shrinkability of the heat shrinkable film | | |
| 80° C. shrinkage factor (%) | 72 | 75 |
| Natural shrinkage factor (%) | 0.4 | 0.2 |
| Resistance to fusion bonding in hot water | ○ | ○ |

*1: The amounts of the styrene resin and the block copolymer are indicated in terms of % by weight, based on the total weight of the styrene resin and the block copolymer.
*2: Stabilizer A: 2-(1-(2-hydroxy-3,5-di-t-pentylphenyl)ethyl)-4,6-di-t-pentylphenyl acrylate
Stabilizer C: 2,4-bis((octylthio)methyl)-o-cresol
Stabilizer D: n-octadecyl-3-(3,5-di-t-butyl-4-hydroxyphenyl)-propionate
Stabilizer F: tris(nonylphenyl)phosphite
*3: The amounts of the stabilizers are indicated in terms of parts by weight, relative to 100 parts by weight of the block copolymer.

INDUSTRIAL APPLICABILITY

A shaped article (such as a sheet) produced from the block copolymer, block copolymer composition or block copolymer/styrene resin composition of the present invention not only is free from marked occurrence of FE's (fish eyes), but also has excellent stiffness, elongation, impact resistance, transparency and heat shrinkability. Therefore, the block copolymer or composition of the present invention can be advantageously used in various application fields. For example, the block copolymer or composition of the present invention can be molded by injection molding, blow molding or the like to obtain a container for parts of office automation apparatuses, daily commodities, food, miscellaneous goods, parts of light electric appliances and the like. Especially, it is advantageous to use the block copolymer or composition of the present invention for producing a thin film (such as a heat shrinkable film or a laminate film), a transparent sheet (such as a blister case for food or parts of light electric appliances) and the like.

What is claimed is:

1. A block copolymer comprising:
   at least two S polymer blocks, each comprising at least 70% by weight of vinyl aromatic hydrocarbon monomer units, and
   one or more B polymer blocks selected from the following polymer blocks (a), (b) and (c):
   (a) a polymer block comprising isoprene monomer units or comprising isoprene monomer units and vinyl aromatic hydrocarbon monomer units,
   (b) a polymer block comprising 1,3-butadiene monomer units or comprising 1,3-butadiene monomer units and vinyl aromatic hydrocarbon monomer units, and
   (c) a polymer block comprising isoprene monomer units and 1,3-butadiene monomer units or comprising isoprene monomer units, 1,3-butadiene monomer units and vinyl aromatic hydrocarbon monomer units, wherein the content of the vinyl aromatic hydrocarbon monomer units in each of said polymer blocks (a) to (c) is less than 70% by weight, wherein:
- (B-1) at least one polymer block (a) and at least one polymer block (b) are present in combination as said one or more B polymer blocks,
- (B-2) at least one polymer block (a) and at least one polymer block (c) are present in combination as said one or more B polymer blocks,
- (B-3) at least one polymer block (a), at least one polymer block (b) and at least one polymer block (c) are present in combination as said one or more B polymer blocks,
- (B-4) at least one polymer block (b) and at least one polymer block (c) are present in combination as said one or more B polymer blocks, or
- (B-5) at least one polymer block (c) alone is present as said one or more B polymer blocks, the amount of the vinyl aromatic hydrocarbon monomer units in said block copolymer and the total amount of the isoprene monomer units and the 1,3-butadiene monomer units in said block copolymer being, respectively, from 60 to 95% by weight and from 40 to 5% by weight, each based on the weight of said block copolymer, said block copolymer having an isoprene monomer unit/ 1,3-butadiene monomer unit weight ratio of from 45/55 to 97/3, and wherein the vinyl aromatic hydrocarbon monomer unit moiety of said block copolymer has a short segment ratio of from 0 to 30 % by weight, wherein said short segment ratio is defined as the weight percentage, based on the total weight of vinyl aromatic hydrocarbon monomer units contained in said block copolymer, of the vinyl aromatic hydrocarbon monomer units contained in at least one short segment consisting of 1 to 3 vinyl aromatic hydrocarbon monomer units.

2. The block copolymer according to claim 1, which comprises (B-5) at least one polymer block (c) alone as said one or more B polymer blocks.

3. The block copolymer according to claim 1, which comprises (B-1) at least one polymer block (a) and at least one polymer block (b) in combination as said one or more B polymer blocks.

4. The block copolymer according to claim 1, wherein said isoprene monomer unit/1,3-butadiene monomer unit weight ratio is in the range of from 55/45 to 95/5.

5. The block copolymer according to claim 1, wherein said short segment ratio is in the range of from 1 to 25% by weight.

6. The block copolymer according to claim 1, which is a linear block copolymer.

7. A block copolymer composition comprising 100 parts by weight of the block copolymer of any one of claims 1 to 6 and 0.05 to 3 parts by weight of at least one stabilizer which is selected from the group consisting of 2-(1-(2-hydroxy-3,5-di-t-pentylphenyl)ethyl)-4,6-di-t-pentylphenyl acrylate, 2-t-butyl-6- (3-t-butyl-2hydroxy-5-methylbenzyl)-4-methylphenyl acrylate, and 2,4-bis((octylthio)methyl)-o-cresol.

8. A block copolymer/styrene resin composition comprising 10 to 99% by weight of the block copolymer of any one of claims 1 to 6 and 90 to 1% by weight of a styrene resin.

9. A block copolymer/Styrene resin composition comprising the block copolymer composition of claim 7 and a styrene resin, wherein the weight ratio of the block copolymer present in said block copolymer composition to said styrene resin is 10/90 to 99/1.

* * * * *